UNITED STATES PATENT OFFICE.

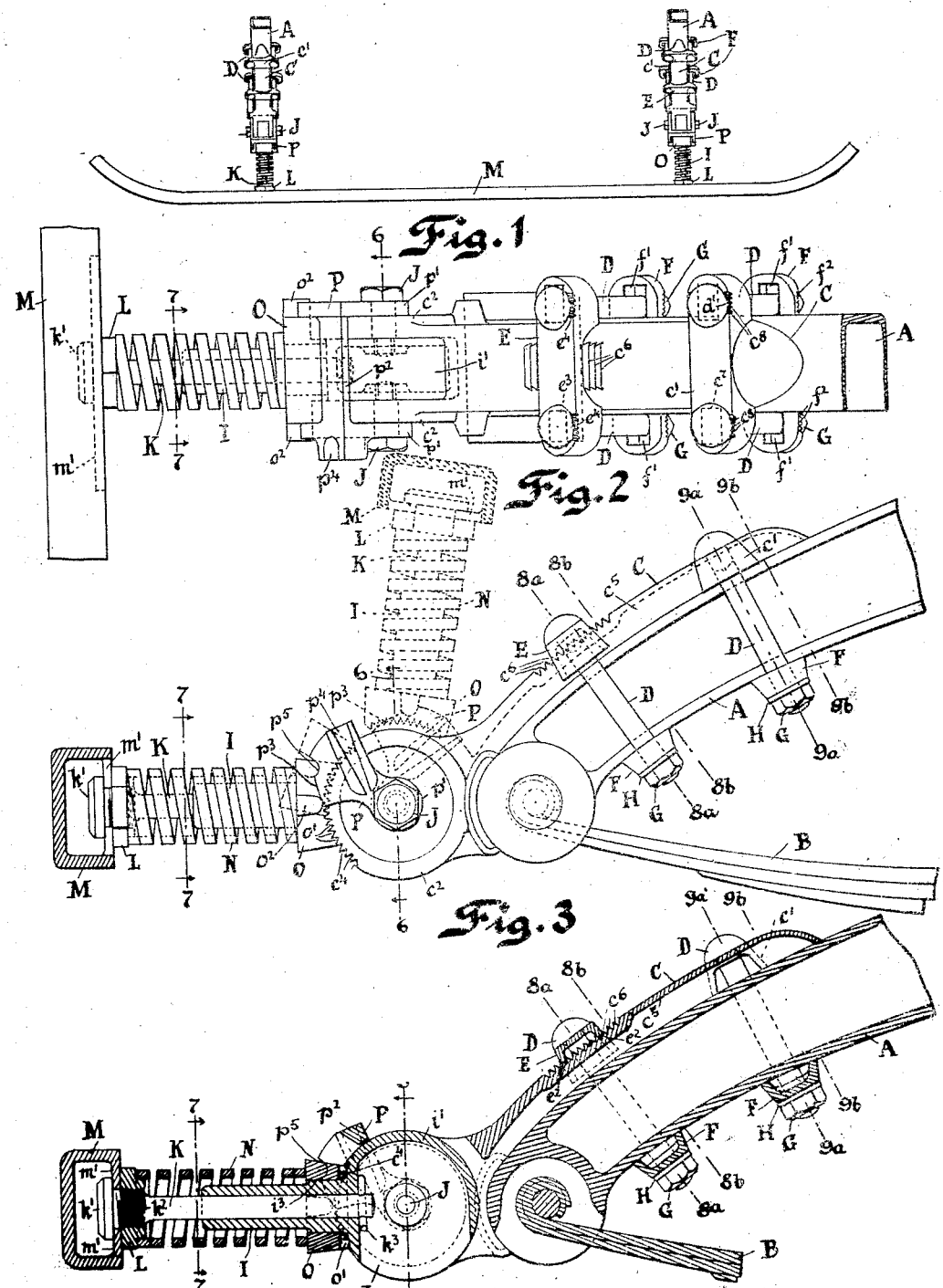

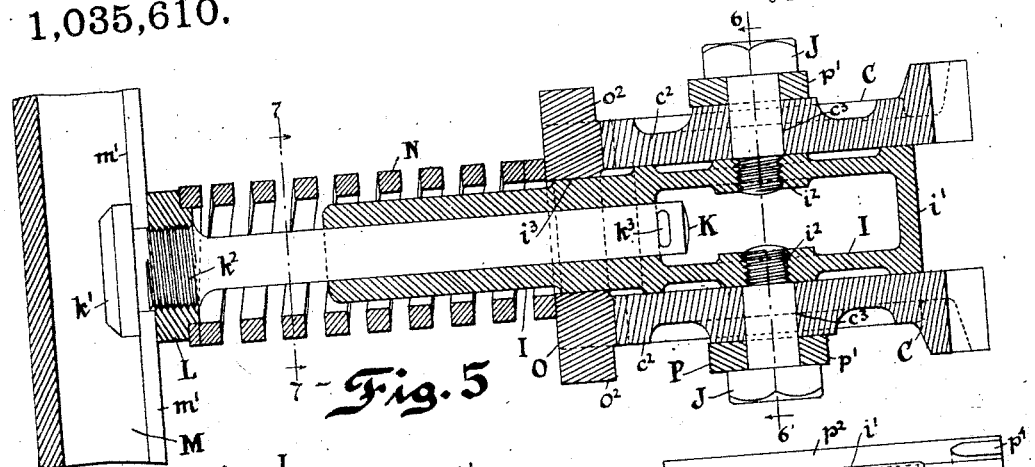

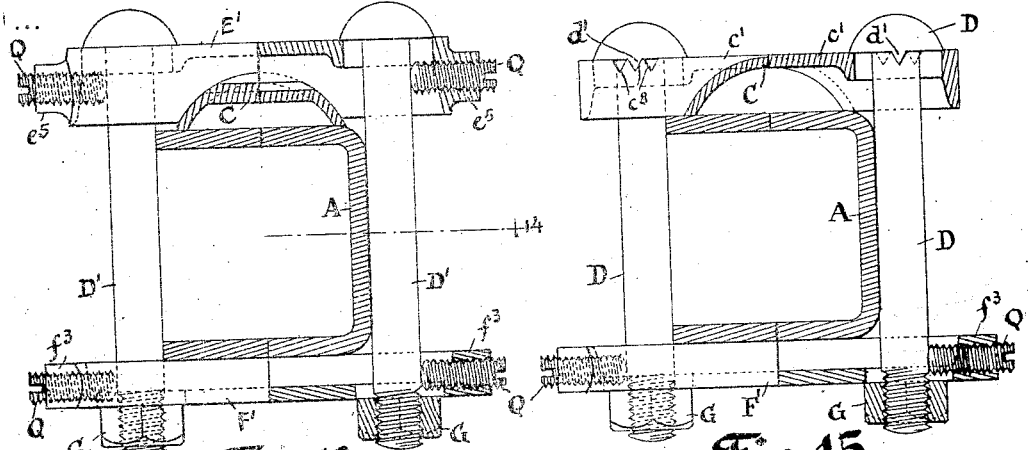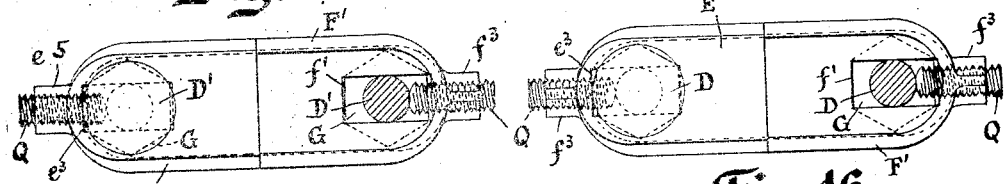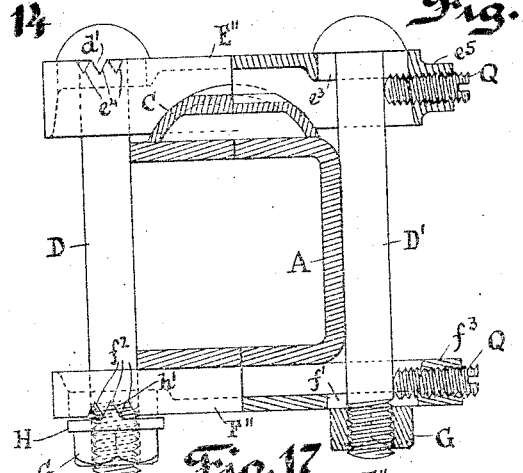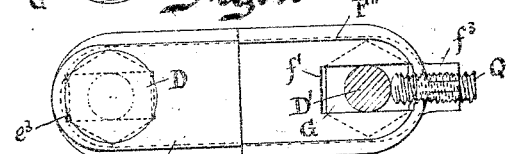

FRIEDRICH LEDERER, OF MILWAUKEE, WISCONSIN.

AUTOMOBILE-BUMPER.

1,035,610.  Specification of Letters Patent.  Patented Aug. 13, 1912.

Application filed May 29, 1911. Serial No. 630,129.

*To all whom it may concern:*

Be it known that I, FRIEDRICH LEDERER, of Milwaukee, Wisconsin, have invented an Automobile-Bumper, of which the following is a specification.

This invention relates to bumpers or buffer-bars intended for automobiles. Such devices are commonly in the form of a transverse bar extending across the front of the vehicle, and mounted yieldingly on bracket-arms which are secured to the front frame-ends of the vehicle. These frame-ends are generally similar and similarly placed in nearly all vehicles of this type, but differ in detailed form, dimensions, and position to some extent.

It is the object of my invention to provide a bumper which can be readily attached to any automobile, and which is adjustable to all such differences in dimensions, form and position of the front frame-bars.

I further aim to provide a bumper or buffer-bar on pivots, and means for locking it in its normal position, together with means for quickly unlocking it and swinging it about said pivots into an upper or lower position, so as to get it out of the way when it is desired to inspect, repair or adjust the engine, or other motive apparatus in the front part of the vehicle.

I further aim to provide a buffer-bar which shall be adjustable in height within certain limits, so as to vary itself to the demands of individual vehicles.

To this end my invention comprises, first, a pair of base-members which are adapted to be secured to the frame-ends, and are provided with hubs; secondly, adjustable means for securing said members to hubs of variable width and shape; thirdly, resilient spring-arms for supporting the bumper, said spring-arms being pivoted upon said hubs so as to swing about their pivots; fourthly, means for locking said bars in adjustable position to said hubs; fifthly, means for disengaging the locking-device and holding it so, whereby said arms are free to swing about their pivots; and sixthly, a buffer-bar which is provided with means for adjustably securing it to the ends of said arms whereby differences in spacing between the two arms are provided for.

My invention further consists in constructions and combinations hereinafter to be described and more particularly set forth in my claims.

For the better understanding of my invention I have illustrated the same in the accompanying drawings, wherein—

Figure 1 is a plan-view of the complete device; Fig. 2 is a plan-view on a larger scale of one side of the device with a portion of the buffer-bar attached thereto; Fig. 3 is a side-elevation of the same, showing the buffer-bar in section; Fig. 4 is a longitudinal section through the same; Fig. 5 is a plan median-section through the axis of the supporting-arm; Figs. 6 and 7 are transverse-sections on the planes 6 and 7 respectively; Figs. 8 and 9 are transverse-sections on the stepped planes $8^a$, $8^b$ and $9^a$, $9^b$ respectively; Fig. 10 is a perspective view of one of the toothed washers used in connection with the fastening-apparatus shown in Figs. 8 and 9; Fig. 11 is a perspective-view from the under-side of the head-portion of one of the bolts of said apparatus; Fig. 12 is a perspective of the adjustable fastening-cleat shown in Fig. 8. Fig. 13 is a view similar to Fig. 8 showing an alternative construction; Fig. 14 is a plan thereof, of which the right-hand half is shown in section upon the plane 14; the automobile frame-end being omitted; Figs. 15 and 16 are views similar to Figs. 13 and 14 showing another alternative construction; and Figs. 17 and 18 are views similar to figures 13 and 14 showing another alternative construction.

The reference letters refer each to the same part in each figure of the drawings.

In Figs. 1 to 4 of the drawings are shown the front-end portions of the automobile-frame A supporting the vehicle upon half-elliptic springs B. Upon these frame-ends on each side are fixed the two base-members C, said frame-members having a shape adapted to lie against and hug the upper side and front-ends of said frame-ends, and being secured thereto adjustably by means of bolts D, transverse cleats $c'$ and E, supplementary cleats F, nuts G and washers H in a manner which will be hereinafter described in detail. Each of the base-members C has a forked hub $c^2$ consisting of a pair of flanges, between which is rotatably mounted the hub $i'$ of a tubular-member I, which forms one of the two members of the resilient-arm supporting the buffer-bar. This member I is pivoted upon a pair of cap-screws J, which turn in bearings $c^3$ in the hubs $c^2$, and are fixed in screw-threaded apertures $i^2$ in the sides of the hub $i'$. The member I is made tubular, to receive the sliding-pin K, which has on its free end a head $k'$ and a threaded-boss $k^2$, on which turns a nut L by means of which the buffer-bar M is secured to said pin. The buffer-bar has a channel-shaped section curved at the ends and along the edges of its flanges for a short distance; on each side of the supporting-arms are formed a pair of inwardly projecting flanges $m'$ which are adapted to be clamped between the head $k'$ and nut L.

The resilient-arm which supports the buffer-bar and consists of the members I, K is kept extended by means of a coiled spring N, which is disposed between the two members under compression, its outer end resting upon the nut L. At its inner-end there is placed a toothed locking-member O, said member having two sets of serrations or teeth $o'$ adapted to enter and engage with a set of corresponding serrations $c^4$ formed on the flanges $c^2$. As the latter serrations $c^4$ extend through a wider arc than the serrations $o'$, the member O may be adjusted to any one of a number of positions within a given angle. Said member O is prevented from turning on the member I by providing the latter with a non-circular boss $i^3$, and the member O with a corresponding non-circular aperture within which the boss fits. Against the member O, as aforesaid, presses the end of the spring N, thus holding the member O in engagement with the base-member and keeping the buffer-bar in the corresponding position so fixed. The limiting outward movement of the member K is fixed by a split-pin $k^3$ disposed in a hole on the inner-side of the hub $i'$, as clearly shown in Figs. 5 and 6.

For the purpose of readily releasing the member O from its engagement, I provide a releasing-device P, which is of three-sided form having on each of its opposite sides a hub $p'$ turning on the respective cap-screw J, and a cross-bar $p^2$ joining them across the top. On both sides it is provided with a cam-edge $p^3$, and with said cam-edges co-operate two laterally-projecting lugs $o^2$ on opposite sides of the member O. On one side moreover the member P is provided with a socket $p^4$, adapted to receive the end of a screw-driver or like tool; the effect being that when the screw-driver is inserted in said socket and turned down, the buffer-bar M being held fast by the other hand, the cam-edge $p^3$ forces the lugs $o^2$, and hence the member O, outwardly until it is free from the teeth $c^4$, and said member P has at the upper end of the cam-edge $p^3$ a shallow socket $p^5$, into which said lugs $o^2$ fall and are maintained by the pressure of the spring; the buffer-bar, together with the two resilient arms, being in this case free to swing about their pivots in the manner indicated by the dotted-line position in Fig. 3. Thus the buffer-bar can be adjusted to any height within a certain range by engaging the member O in different positions with the teeth $c^4$, and when it is desired to have it out of the way for any purpose, it can be unlocked in the manner described, and swung up or down.

Considering now the means for securing the shank $c^5$ of the member C to the frame-ends of the vehicle, it should be observed that the said shank is made in a form sufficiently flexible, so that it can be drawn around to adjust itself in the exact shape of the frame-end by the tension of the bolts D in drawing them up. This shank has at its rear-end the cross-bar $c'$, which acts as a fixed cleat, said bar being shown in side-view and in longitudinal section in Fig. 9. In addition to the fixed cleat or cross-bar $c'$ is a movable cleat E, which is made movable in order that it may be brought as close as possible to the end of the frame-bar of the individual machine to which it is attached. Said movable cleat is shown in perspective in Fig. 12. The means by which it is made adjustable in position consists in forming the upper surface of the shank $c^5$ with a series of transverse notches or serrations $c^6$, and in providing the lower face of the cleat E, which is recessed at $e'$, Fig. 12, to correspond to the curvature of $c^5$, with corresponding teeth $e^2$, which are adapted to engage therewith. Now, to provide for different widths of frame-ends, the ends of the cross-bar $c'$ and of the cleats E and F are longitudinally slotted as shown at $c^7$, $c^3$ and $f'$, and to hold the bolts in their positions and prevent them from moving away from the frame-bar, the cross-bar $c'$ and the cleats E and F have on their outer faces a series of transverse corrugations or serrations $c^8$, $e^4$ and $f^2$, while the heads of the bolts D have on their under-side each a single transverse tooth $d'$, adapted to engage with one of the serrations $c^8$, or $e^4$; and correspondingly a pair of washers H (Fig. 10) are used on the opposite ends of the bolts, each of which has a tooth $h'$ adapted to fit in one of the serrations $f^2$ under the nut G.

In use, the bolts will of course be adjusted in the particular notch $c^8$, $e^4$ or $f^2$, which will bring them closest to the frame-bar ends, but to enable the adjustment to be carried out more precisely, without unnecessarily multiplying the number of said notches, I form the tooth $d'$ not exactly diametral of the bolt-head, but very slightly to one side thereof, that is to say, about one-fourth of the pitch of the notches $f^2$ $c^3$, $e^4$; whereby a slightly different adjustment is provided by the bolt, when in any given position, from that when it is reversed in position, that is, turned through 180 degrees about its axis. This eccentric position of the tooth $d'$ is clearly shown in Fig. 11, and the tooth $h'$ on the washer H is similarly placed, as shown in Fig. 10.

Where a more exact adjustment is desired than that provided by the notches $c^3$, $e^4$ and $f^2$ and the teeth $d'$ and $h'$, I may provide the construction shown in Figs. 13 and 14, in which the members E′, F′ take the place of the members E and F, being the same with the omission of the teeth $e^4$ and $f^2$. The washers H are omitted and bolts D′ with plain heads are substituted for the bolts D. Instead of the notch-engagement are provided set-screws Q which enter threaded sockets $e^5$ and $f^3$ in the ends of the members E′ and F′ and abut laterally upon the bolts D; whereby after the bumper is set up, and before the bolts D are tightened, they can be pressed laterally against the sides of the frame-end A by the screws Q. This provides an exact adjustment and also secures a lateral clamping effect.

Instead of providing screws Q at both ends of the bolts as shown in Fig. 13, I may provide them at one end only, as shown in Fig. 15, wherein the members E and the bolts D remain as in Fig. 8, and the members F′ are provided with the screws Q as in Fig. 13. In this form the bolts can be adjusted to their closest positions in notches $e^4$, and then the set-screws Q applied to clamp them firmly at the lower ends, after which the nuts G are drawn up. Instead of this arrangement, I may provide that shown in Figs. 17 and 18, in which the members E″ and F″ are used, having on one end the notches $e^4$ and $f^2$ and at the other the set-screws Q in threaded sockets $e^5$ and $f^3$. In this case, after the adjustment of the base-member C to a substantially central position on the member A, the left-hand bolt D is adjusted in the notches $e^4$ as close as possible to the member A, and the washer H in the notches $f^2$. The screws Q on the other side are then applied to force up the other bolt D′ and clamp the frame-end A laterally as before, after which the nuts G are tightened. It will be seen therefore that all possible variations in the size, position and shape of the frame-bar ends are within certain limits provided for by corresponding adjustments, and that my improved bumper may be readily applied to any automobile of standard style without any special fitting.

I wish it understood that my invention is not limited to the use of all the above described features and constructions, for some may be omitted and others may be varied or modified in various ways, as will readily occur to those skilled in the art.

Having thus described my invention, what I claim as new and desire to secure by Letters Patent is:

1. The combination of a fixed member having a hub, a bumper-carrying arm pivotally mounted with respect to said hub, a member carried by said arm and resiliently pressed against said hub and having means for engagement with the same, and a releasing-member adapted to force back said last-named member away from said hub, and hold it in such position, whereby said arm may be freely swung about its pivot.

2. The combination of a base-member, a bumper-carrying arm in two parts which are slidably connected together, one of said parts being pivoted upon said base-member, a spring under compression between said two parts; said base-member having a notched arc; and a member slidably mounted on said arm and receiving the pressure of one end of said spring, whereby it is pressed toward the pivot, said member having one or more projecting elements adapted to engage with said notches, thereby acting to maintain said arm in the radial position in which it is set.

3. The combination of a base-member, a bumper-carrying arm in two parts which are slidably connected together, one of said parts being pivoted upon said base member, a spring under compression between said two parts; said base-member having a notched-arc; a member slidably mounted on said arm and receiving the pressure of one end of said spring whereby it is pressed toward the pivot, said member having one or more projecting elements adapted to engage with said notches thereby acting to maintain said arm in the radial position in which it is set, and a releasing-member pivotally mounted coaxially with said arm and having a cam-edge adapted to engage and force back said sliding-member.

4. The combination of a base-member, a bumper-carrying arm in two parts which are slidably connected together, one of said parts being pivoted upon said base-member, a spring under compression between said two parts; said base-member having a notched arc; a member slidably mounted on said arm and receiving the pressure of one end of said spring whereby it is pressed toward the pivot, said member having one or more projecting elements adapted to engage with said notches thereby acting to maintain said arm in the radial position in which it is set, and a releasing-member pivotally mounted coaxially with said arm and having a cam-edge adapted to engage and force back said sliding-member; said releasing-member having further means for retaining said sliding member in its held-back position.

5. The combination of a base-member having a double-flanged hub, each flange of said hub having a plurality of notches or serrations on its periphery, a bumper-carrying arm in two parts, one of which is tubular and is pivotally mounted between the flanges of said hub, and the other part mounted to reciprocate in the bore of said tubular part; a spring under compression between said two parts holding them resiliently extended; a sliding catch-member mounted to reciprocate on said first-named part of said arm and having two sets of arcuate notches or serrations adapted to interengage with the notches or serrations on the respective hub-flanges, said sliding member having further a pair of projecting lugs on its opposite sides; and a releasing-member pivotally mounted on said hub, said member having a pair of oblique cam-edges adapted upon the rotative movement of said releasing-member to engage and throw back said sliding-member so as to disengage the notches thereof from those of said hub.

6. The combination of a base-member having a double-flanged hub, each flange of said hub having a plurality of notches or serrations on its periphery, a bumper-carrying arm in two parts, one of which is tubular and is pivotally mounted between the flanges of said hub, and the other part mounted to reciprocate in the bore of said tubular part; a spring under compression between said two parts holding them resiliently extended; a sliding catch-member mounted to reciprocate on said first-named part of said arm and having two sets of arcuate notches or serrations adapted to interengage with the notches or serrations on the respective hub-flanges, said sliding-member having further a pair of projecting-lugs on its opposite sides; and a releasing-member pivotally mounted on said hub, said member having a pair of oblique cam-edges adapted upon the rotative movement of said releasing-member to engage and throw back said sliding-member so as to disengage the notches thereof from those of said hub; said releasing-member having further at the outer ends of said cam-edges depressions or sockets wherein said lugs are adapted to rest in the held-back position of said sliding-member.

7. The combination of a base-member having a double-flanged hub, each flange of said hub having a plurality of notches or serrations on its periphery, a bumper-carrying arm in two parts, one of which is tubular and is pivotally mounted between the flanges of said hub, and the other part mounted to reciprocate in the bore of said tubular part; a spring under compression between said two parts holding them resiliently extended; a sliding catch-member mounted to reciprocate on said first-named part of said arm and having two sets of arcuate notches or serrations adapted to interengage with the notches or serrations on the respective hub-flanges, said sliding-member having further a pair of projecting-lugs on its opposite sides; and a releasing-member pivotally mounted on said hub, said member having a pair of oblique cam-edges adapted upon the rotative movement of said release-member to engage and throw back said sliding-member so as to disengage the notches thereof from those of said hub; said releasing-member having a radial socket adapted to receive the end of a screw-driver or like tool whereby it may be rotated.

8. The combination of a base-member having a double-flanged hub, each flange of said hub having a plurality of notches or serrations on its periphery, a bumper-carrying arm in two parts, one of which is tubular and is pivotally mounted between the flanges of said hub, and the other part mounted to reciprocate in the bore of said tubular part; a spring under compression between said two parts holding them resiliently extended; a sliding catch-member mounted to reciprocate on said first-named part of said arm and having two sets of arcuate notches or serrations adapted to interengage with the notches or serrations on the respective hub-flanges, said sliding-member having further a pair of projecting-lugs on its opposite sides; a releasing-member pivotally mounted on said hub, said member having a pair of oblique cam-edges adapted upon the rotative movement of said releasing-member to engage and throw back said sliding-member so as to disengage the notches thereof from those of said hub; and a pair of cap-screws forming pivot-journals for said arm and releasing-member upon said hub, said cap-screws being inserted from opposite sides through holes in said releasing-member and said hub and being fixed in threaded sockets in the inner tubular part of said arm.

9. The combination of a buffer-bar having a trough-shaped or channel-shaped cross-section and a pair of inwardly extending flanges, and a supporting-arm having means for clamping on opposite sides of said flanges, whereby said bar is adjustable with respect to said arm.

10. The combination of a buffer-bar having a pair of opposite inwardly extending parallel flanges in the same plane, said flanges having between them a parallel-sided opening of substantially uniform width, and a supporting-arm having on its end devices adapted to clamp on opposite sides of said flanges and hold them rigidly with respect to said arm, whereby the latter is longitudinally adjustable with respect to said bar.

11. The combination of a buffer-bar having a pair of opposite inwardly extending parallel flanges in the same plane, said flanges having between them a parallel-sided opening of substantially uniform width, and a supporting-arm having on its end a head adapted to abut on the inner faces of said flanges and a nut adapted to screw up against the outer side of said flanges whereby said flanges are clamped between said head and nut.

12. The combination of a buffer-bar having a pair of opposite inwardly extending parallel flanges in the same plane, said flanges having between them a parallel-sided opening of substantially uniform width, a supporting-arm having on its end a head adapted to abut on the inner faces of said flanges and a nut adapted to screw up against the outer side of said flanges whereby said flanges are clamped between said head and nut; said supporting-arm being formed in two parts one of which telescopes within the other; and a coiled compression-spring surrounding said arm and under compression between said parts, the outer end of said spring abutting upon said nut.

13. In an automobile-bumper, the combination of a base-member adapted to rest and abut against the end of the frame-member of an automobile, and having an elongated shank lying upon the top of said frame-bar end and adapted to be bent to conform therewith; a pair of transverse cleats on said shank; a second pair of cleats subtending the same on the under-side of said frame-bar end; and two pairs of bolts uniting the opposite ends of the respective cleats.

14. In an automobile-bumper, the combination of a base-member adapted to rest and abut against the end of the frame-member of an automobile, and having an elongated shank lying upon the top of said frame-bar end and adapted to be bent to conform therewith; a pair of transverse cleats on said shank; a second pair of cleats subtending the same on the under-side of said frame-bar end; and two pairs of bolts uniting the opposite ends of the respective cleats; the forwardmost pair of cleats being longitudinally adjustable with respect to said shank.

15. In an automobile-bumper, the combination of a base-member adapted to rest and abut against the end of the frame-member of an automobile, and having an elongated shank lying upon the top of said frame-bar end and adapted to be bent to conform therewith; a pair of transverse cleats on said shank; a second pair of cleats subtending the same on the under-side of said frame-bar end; and two pairs of bolts uniting the opposite ends of the respective cleats; the forwardmost cleat on said shank being independent of said shank, and adapted to engage the same in various longitudinally separated positions.

16. In an automobile-bumper, the combination of a base-member adapted to rest and abut against the end of the frame-member of an automobile and having an elongated shank lying upon the top of said frame-bar end and adapted to be bent to conform therewith; a fixed transverse cleat on the rear-end of said shank, a cleat adapted to subtend the same on the lower side of the frame-bar end, bolts uniting said cleats together; said shank having on its forward part a plurality of transverse serrations or notches; a third cleat adapted to lie transversely across said shank and having teeth adapted to interengage any of said notches; a fourth cleat subtending said last-named cleat on the lower side of said frame-bar end; and a second pair of bolts adapted to unite said last-named cleats.

17. In combination with a base-member of an autobumper, said member having a shank adapted to lie upon the upper side of the frame-bar end of the automobile, adjustable means for securing it to said frame-bar end comprising a pair of transverse cleats having slots in their ends, and a pair of bolts passing through said slots and adapted to unite the opposite ends of said cleats; said bolts being longitudinally adjustable with respect to said cleats.

18. In combination with a base-member of an automobile-bumper, said member having a shank adapted to lie upon the upper side of the frame-bar end of the automobile, adjustable means for securing it to said frame-bar end comprising a pair of transverse cleats having slots in their ends and a pair of bolts passing through said slots and adapted to unite the opposite ends of said cleats, each of said cleats having on its outer face a plurality of transverse notches, and the bolt-heads having projecting teeth on their under sides adapted to engage in any of said notches, and a pair of washers on the ends of said bolts opposite said heads having similar teeth adapted to engage in the notches of the other cleat.

19. In combination with a base-member of an automobile-bumper, said member having a shank adapted to lie upon the upper side of the frame-bar end of the automobile, adjustable means for securing it to said frame-bar end comprising a pair of transverse cleats having slots in their ends and a pair of bolts passing through said slots and adapted to unite the opposite ends of said cleats, each of said cleats having on its outer face a plurality of transverse notches, and the bolt-heads having projecting teeth on their under sides adapted to engage in any of said notches, and a pair of washers or the ends of said bolts opposite said heads having similar teeth adapted to engage in the notches of the other cleat; said teeth on said bolt-heads and washers being slightly at one side of the diametral plane whereby different adjustments of the bolts with respect to the cleats can be obtained by reversing the positions of the bolts.

20. In combination with the base-member of an automobile-bumper, said member having a shank adapted to lie upon the upper side of the frame-bar end of the automobile, adjustable means for securing it to said frame-bar end, and adaptable to special form and dimensions of said frame-bar end, said means comprising a rectangular frame of four members, and means for drawing together the four members over the frame-bar end and shank both laterally and vertically.

21. In combination with a base-member of an automobile-bumper, said member having a shank adapted to lie upon the upper side of the frame-bar end of the automobile, adjustable means for securing it to said frame-bar end, and adaptable to vertical and horizontal variations in the dimensions thereof, said means comprising a pair of transverse cleats, and a pair of bolts uniting them, means for adjusting the distance between said bolts to the lateral width of said frame-bar end, and means for drawing up said bolts.

22. In combination with a base-member of an automobile-bumper, said member having a shank adapted to lie upon the upper side of the frame-bar end of the automobile, adjustable means for securing it to said frame-bar end, and adaptable to vertical and horizontal variations in the dimensions thereof, said means comprising a pair of transverse cleats and a pair of bolts uniting them, means for moving said bolts together so as to clamp the frame-bar end between them, and means for drawing said cleats together on said bolts, so as to clamp said frame-bar end and shank together.

23. In combination with a base-member of an automobile-bumper, said member having a shank adapted to lie upon the upper side of the frame-bar end of the automobile, adjustable means for securing it to said frame-bar end and adaptable to variations in width and depth thereof, said means comprising a pair of transverse cleats having slots in their ends, and a pair of bolts passing through said slots and adapted to draw together the opposite ends of said cleats; together with means for varying the lateral distance between said bolts.

24. In combination with a base-member of an automobile-bumper, said member having a shank adapted to lie upon the upper side of the frame-bar end of the automobile, adjustable means for securing it to said frame-bar end and adaptable to variations in width and depth thereof, said means comprising a pair of transverse cleats having slots in their ends, and a pair of bolts passing through said slots and adapted to draw together the opposite ends of said cleats, and set-screws in the ends of said cleats at right angles to said bolts adapted to clamp them against said frame-bar end.

25. In combination with the base-member of an automobile-bumper, said member having a shank adapted to lie upon the upper side of the frame-bar end of the automobile, adjustable means for securing it to said frame-bar end comprising a pair of transverse cleats having slots in their ends, and a pair of bolts passing through said slots and adapted to unite the opposite ends of said cleats; one of said cleats having on its outer face a plurality of transverse notches and the corresponding bolt having a projecting tooth adapted to engage in any of said notches whereby its distance from the other bolt may be varied.

26. In combination with the base-member of an automobile-bumper, said member having a shank adapted to lie upon the upper side of the frame-bar end of the automobile, adjustable means for securing it to said frame-bar end comprising a pair of transverse cleats having slots in their ends and a pair of bolts passing through said slots and adapted to unite the opposite ends of said cleats; and a set-screw mounted in a threaded socket in one end of one of said cleats and adapted to press laterally against the corresponding bolt.

27. In combination with the base-member of an automobile-bumper, said member having a shank adapted to lie upon the upper side of the frame-bar end of the automobile, adjustable means for securing it to said frame-bar end comprising a pair of transverse cleats having slots in their ends, a pair of bolts passing through said slots and adapted to unite the opposite ends of said cleats,—and a set-screw mounted in the threaded socket in the end of one of said cleats and adapted to press laterally against the corresponding bolt; the other end of said cleat having on its outer face a plurality of transverse notches and the corresponding bolt having a projection adapted to engage any of said notches and thereby laterally vary the position of said bolt.

28. In combination with a base-member of an automobile-bumper, said member having a shank adapted to lie upon the upper side of the frame-bar end of the automobile, adjustable means for securing it to said frame-bar end comprising a pair of transverse cleats having slots in their ends, a pair of bolts passing through said slots and adapted to unite the opposite ends of said cleats, and a set-screw mounted in a threaded socket in one end of one cleat and pressing laterally against the corresponding bolt; the corresponding end of the other cleat having on its outer face a plurality of notches and the bolt carrying a projection adapted to engage in any of said notches; whereby the lateral position of the bolt may be varied.

In witness whereof I have hereunto set my hand in the presence of two witnesses.

FRIEDRICH LEDERER.

Witnesses:
ADOLPH HENN
ARTHUR KERN.